United States Patent Office 3,325,403
Patented June 13, 1967

3,325,403
SEALING POROUS FORMATIONS
Charles A. Sauber, Bartlesville, Okla., assignor to Phillips Petroleum Company, a corporation of Delaware
No Drawing. Filed June 8, 1964, Ser. No. 373,547
10 Claims. (Cl. 252—8.5)

This invention relates to a method and a composition for sealing porous formations, particularly porous formations in the earth encountered in the drilling of a well. In a more specific aspect the invention relates to a method and a composition for sealing porous formations with a weighted material so as to offset the effects of high pressure fluids in formations penetrated in the drilling of a well. In still another aspect the invention relates to a method and composition for weighting a lost circulation slurry without adversely affecting the high water loss property of the slurry.

In the drilling of a well with well drilling tools a drilling fluid is circulated into and out of the well bore as a necessary step in the operation. The drilling fluid serves to cool and lubricate the bit, to carry cuttings to the surface, to support at least part of the weight of the drill pipe and drill bit, to provide a hydrostatic pressure head for prevention of caving of the walls of the well bore, to deposit on the surface of the well bore a filter cake which acts as a thin, semi-impervious layer to prevent undue passage therethrough of fluids, and to perform other functions as are well known in the drilling art. It is important that the drilling fluid exhibit a relatively low rate of filtration or fluid loss in addition to having desirable rheological properties such as viscosity and gel strengths. It is also important that the drilling fluid system should be kept as simple and as inexpensive as possible in order to avoid undue expense in the drilling of a well.

When drilling through porous or fractured formations or other formations having a relatively high porosity or permeability to the drilling fluid, it sometimes occurs that the drilling fluid is lost to the formation and a condition referred to as lost circulation obtains wherein the drilling fluid passes into the formation at such rate that circulation is greatly reduced or even terminated. In such case the drilling of the well must be stopped and the condition corrected before drilling can be continued again. If the condition of lost circulation cannot be corrected, it is then necessary to abandon the well.

Various methods and means have been employed in the past to restore circulation of the drilling fluid when a lost circulation condition has occurred and such methods usually entail the addition to the drilling mud of fibrous materials to form a mat upon which a mud sheath can be deposited. Almost all known fibrous materials have been used in drilling fluid compositions to seal the thief formation in attempts to restore circulation of the drilling fluid when a lost circulation condition has been encountered.

More recently lost circulation slurries have been devised which contain a lost circulation material in a high water loss slurry designed to lose water rapidly so as to form a mat in the fissure or other opening which forms the thief formation and also an agent designed to suspend the lost circulation material as a relatively stable aqueous slurry to facilitate handling the slurry during its placement adjacent the thief formation. One particularly effective lost circulation material is diatomite which is also known as diatomaceous earth, infusorial earth or kieselguhr and is composed of the silicified skeletons of diatoms. Attapulgite clay has been used as the suspending agent for suspending diatomaceous earth as a relatively stable aqueous slurry. Attapulgite clay which is a Fuller's earth and is a unique clay mineral in that its crystalline structure is needle-like in shape is anhydrous magnesium aluminum silicate. An outstanding lost circulation slurry is an aqueous slurry of diatomite with a sufficient amount of asbestos to form a stable, low viscosity system. Such slurry has an extremely high water loss property which is rendered still higher by incorporating therein a relatively small amount of calcium hydroxide. Such slurry and its use are disclosed and claimed in copending application Ser. No. 248,224, filed Dec. 31, 1962, by Charles A. Sauber et al., now U.S. Patent No. 3,253,664.

In using lost circulation slurries it is often necessary to employ a weighted slurry so as to counteract fluids produced from high pressure formations encountered in the drilling operations. High pressure fluids can be produced either above or below the thief formation. Weighting materials usually decrease the water loss property of the lost circulation slurry and thus detract from its usefulness.

It is an object of this invention to provide a method for weighting an aqueous lost circulation slurry without unduly lowering the high water loss property of the slurry. It is also an object of this invention to provide a weighted lost circulation slurry having a high water loss property. Still another object of this invention is the provision of a method for treating a weighting material so that incorporation of the treated, weighted material in a lost circulation slurry does not unduly lower the high water loss property of the slurry. Still another object of the invention is to provide a method for treating a weighted lost circulation slurry to increase the water loss property of the weighted slurry. Other objects and advantages of this invention will be apparent to one skilled in the art upon reading this disclosure including the detailed description of the invention.

Broadly, the invention contemplates adding to the weighting material or to the aqueous slurry containing the weighting material a quaternary ammonium compound having at least one long-chain aliphatic radical with about 8 to 24 carbon atoms. The weighting material can be pretreated with the quaternary ammonium compound prior to incorporation of the weighting material in the lost circulation slurry or the lost circulation slurry containing weighting material can be treated with the quaternary ammonium compound. The quaternary ammonium compound appears to attach itself preferentially to the weighting material when the quaternary ammonium compound is added to an aqueous slurry containing the weighting material. It is only necessary to contact the weighting material with a sufficient quantity of the quaternary ammonium compound so as to result in a monomolecular film of the quaternary ammonium compound over the surface, or at least a major portion of the surface, of the weighting material. An excess of the quaternary ammonium compound has no apparent effect on the lost circulation slurry. It may be that the quaternary ammonium compound also attaches itself to the other solid materials in the lost circulation slurry such as the diatomaceous earth or the attapulgite or the asbestos. The quarternary ammonium compound apparently has no effect on these materials so far as the water loss property of the slurry is concerned.

The normal subsurface pressure gradient is 0.465 pounds per foot which is equivalent to a drilling fluid weight of 8.95 pounds per gallon. Abnormal subsurface pressures are frequently encountered and these can be expected to increase with the depth of the well. Drilling fluid weights of 17 to 19 pounds per gallon are often required to balance formation pressure in deep wells. When drilling fluid is lost to a thief formation and a lost circulation slurry is utilized to plug the thief formation, it is advisable and usually considered necessary for the lost circulation slurry to be of substantially the same density as the drilling fluid being utilized to balance formation pressure.

The following examples will be helpful in demonstrating the adverse effect of a weighting material on the high water loss property of lost circulation slurries and the degree to which practice of the present invention overcomes these adverse effects. The data of the specific embodiments of the invention should be considered as exemplary and not interpreted as unduly limiting the claims.

EXAMPLE

In the runs reported in the following Table I the Lost Circulation Admixture (LCA) was a uniform mixture of 44 parts by weight of diatomite, 5 parts by weight of California asbestos corresponding to about 7 grade according to the Quebec Screen Test adopted by the Quebec Asbestos Producers Association which Group 7 material is considered about 14 or 16 Standard U.S. mesh size, and 1 part by weight of calcium hydroxide. The volume of this admixture is 2.80 gallons per 50 pounds of the admixture. The apparent viscosity, yield point and water loss values were determined according to "Recommended Practice on Standard Field Procedures for Testing Drilling Fluids," API Code #RP 29. The effect of long-chain aliphatic quaternary ammonium salts (QAS) on the water loss property of weighted lost circulation slurries is shown in the following Table I.

Representative quaternary ammonium compounds coming within the above structural formula and used in the practice of this invention include:

Octyltrimethylammonium chloride,
Decyltrimethylammonium bromide,
Dodecyltriethylammonium hydroxide,
Tetradecyltrimethylammonium chloride,
Hexadecyltripropylammonium iodide,
Octadecyltributylammonium nitrate,
Octadecenyltriethylammonium chloride,
9-hexadecyltrimethylammonium chloride,
9,12-octadecadienyltrimethylammonium chloride,
9,12,15-octadecatrienyltriammonium acetate,
Didocyldimethylammonium chloride,
Dioctyldimethylammonium chloride,
Didecyldiethylammonium benzoate,
Ditetradecyldimethylammonium chloride,
Dioctadecyldimethylammonium chloride,
Diheptadecyldipropylammonium chloride,
Trioctylmethylammonium chloride,
Dihexadecyldimethylammonium chloride,
Dodecylbenzyldimethylammonium chloride,
Pentadecylbenzyldiethylammonium fluoride,
Octadecylpropyldimethylammonium salicylate,
Dodecylbutylbenzylmethylammonium bromide,
Nonadecyldiethylmethylammonium sulphate,
Eicosatrimethylammonium orthophosphate,
Tetracosyl trimethylammonium chloride,
and the like.

That which is claimed is:
1. The method of increasing the fluid loss property of

TABLE I.—WEIGHTED DIATOMITE SLURRIES

| Run No. | Density, lb./gal. | Limestone, lb./bbl. | Barite, lb./bbl. | LCA, lb./bbl. | (QAS),[1] lb./bbl. | AV. | WL, ml./30 min. | Cake Thickness, inches |
|---|---|---|---|---|---|---|---|---|
| 1 | 11 | 220 | | 35 | | 62 | 340 | 21½/32 |
| 2 | 11 | 220 | | 35 | 1.75 | 78 | 550 | 4²/32 |
| 3 | 16.2 | | 600 | 34 | | 29 | 380 | 4¹⁰/32 |
| 4 | 16.2 | | 600 | 34 | 2 | 67 | 590 | 7²⁴/32 |
| 5 | 8.9 | | | 50 | | 20 | 1,140 | |

[1] Di(hydrogenated tallow) dimethylammonium chloride.

A very small amount of the quaternary ammonium compound is required in the practice of the present invention because it is only necessary that a monomolecular film of quaternary ammonium compound cover the surface or the major portion of the surface of the weighting material particles. About 0.5 pound of quaternary ammonium compound will adequately treat a hundred pounds of weighting material; however, it will oftentimes be more convenient to add the quaternary ammonium compound in amounts based on pounds per barrel of slurry rather than based on the amount of weighting material added to the slurry. Thus, 1 to 5 pounds of quaternary ammonium compound per barrel of slurry will usually be adequate for treating a lost circulation slurry having a density up to about 17 pounds per gallon.

The quaternary ammonium compounds used in this invention represent organic compounds having the structure $(NR_4)xA$ in which four carbon atoms are directly linked to the nitrogen atom and where at least one of said R groups is an aliphatic radical having about 8 to 24 carbon atoms, the remaining R groups are lower aliphatic and benzyl radicals, A is an anion and $x$ is the valence of A. The anion A can be organic or inorganic, for example, hydroxide, chloride, iodide, bromide, fluoride, sulfate, phosphate, acetate, benzoate, salicylate, and the like. The aliphatic R groups can be paraffinic, olefinic, diolefinic, triolefinic, etc., or acetylenic. The total number of carbon atoms in the compound can vary from about 11 to 45.

an aqueous high water loss slurry consisting essentially of an aqueous slurry of diatomite and a suspending agent for said diatomite and a weighting material selected from the group consisting of barium sulfate or calcium carbonate which comprises adding to said slurry in an amount sufficient to render the weighting material hydrophobic a quaternary ammonium compound having the following structural formula:

$(NR_4)xA$ wherein at least one of said R groups is an aliphatic hydrocarbon radical having about 8 to 24 carbon atoms, the remaining R groups are selected from the group consisting of lower aliphatic hydrocarbon and benzyl hydrocarbon radicals, A is an anion, and $x$ is the valence of A; and placing said slurry adjacent a thief formation in a well.

2. The method of claim 1 wherein the amount of quaternary ammonium compound is in the range of about 0.1 to 10 pounds per barrel of well-working fluid.

3. The method of claim 1 wherein the well-working fluid is an aqueous slurry of about 20 to 60 pounds of diatomite, about 2 to 15 pounds of asbestos, about 0.5 to 3 pounds of lime, and about 1 to 625 pounds of weighting material per barrel of slurry and the ammonium compound is di(hydrogenated tallow) dimethylammonium chloride in an amount of about 0.5 to 10 pounds per barrel of slurry.

4. The method of claim 3 wherein the weighting material is barium sulfate.

5. The method of claim 3 wherein the weighting material is calcium carbonate.

6. An aqueous high water loss slurry consisting essentially of an aqueous slurry of diatomite an agent for suspending the diatomite in water, a weighting material selected from the group consisting of barium sulfate or calcium carbonate, and an amount sufficient to render the weighting material hydrophobic of a quaternary ammonium compound having the structural formula:

$$(NR_4)xA$$

wherein at least one of said R groups is a naliphatic hydrocarbon radical having about 8 to 24 carbon atoms, the remaining R groups are selected from the group consiting of lower aliphatic hydrocarbon and benzyl hydrocarbon radicals, A is an anion, and $x$ is the valence of A.

7. The slurry of claim 6 wherein the suspending agent is attapulgite.

8. The slurry of claim 6 wherein the suspending agent is asbestos.

9. The high water loss slurry of claim 6 wherein each barrel of slurry comprises water, about 20 to 60 pound of diatomite, about 2 to 15 pounds of asbestos, abor 1 to 625 pounds of weighting material selected from th group consisting of barium sulfate or calcium carbonat and about 0.5 to 10 pounds of said quaternary ammoniu compound.

10. The slurry of claim 9 containing about 0.5 to pounds of lime per barrel of slurry.

References Cited

UNITED STATES PATENTS

| | | | |
|---|---|---|---|
| 2,797,196 | 6/1957 | Dunn et al. | 252—8. |
| 2,960,465 | 11/1960 | Brink | 252—8. |
| 2,967,150 | 1/1961 | Prokop et al. | 252—8. |
| 3,208,523 | 9/1965 | Coyle et al. | 175—72 |
| 3,253,664 | 5/1966 | Sauber et al. | 175—7 |

LEON D. ROSDOL, *Primary Examiner.*

H. B. GUYNN, *Assistant Examiner.*